United States Patent Office 3,147,126
Patented Sept. 1, 1964

3,147,126
PREPARATION OF CEMENT COMPOSITION
William J. Smothers, Akron, Ohio, assignor to The Ohio Brass Company, Mansfield, Ohio, a corporation of New Jersey
No Drawing. Filed Mar. 19, 1962, Ser. No. 180,877
5 Claims. (Cl. 106—97)

This invention relates to the production of an aggregate-containing cement mixture particularly designed for use in assembling insulators such as line conductor insulators.

The aggregate used in the cement mixture is produced by the regulated firing of a mixture of ball clay and a small amount of lime. Similar aggregate has been used for other purposes but so far as is known the particular aggregate described herein has never heretofore been produced or, if known, it has never heretofore been used as an aggregate in a cement mixture.

According to this invention the cement mixture is composed of the aggregate and Portland cement to which has been added the minimum amount of water required to produce the fluidity necessary for assembling insulators with their hardware.

METHOD OF PREPARING AGGREGATE

The aggregate is prepared from a ball clay such as Hanover clay or English ball clay. These clays tend to give good dry strength to the resulting aggregate for handling before firing. From about 2.5 to 7.5 percent of lime, and preferably 5 percent is mixed with the clay and water is added with intimate mixing to give a uniform mixture either in damp form or as a slurry. This is dried, and then crushed, to produce aggregate of a uniform size. The crushed aggregate is sieved to separate aggregate having a size from −16 to +60 mesh, and preferably −16 to +35 mesh. This aggregate is then fired. The lime acts as a flux to reduce the pores in the aggregate and thus reduces the ability of the fired aggregate to absorb moisture. With 5 percent of lime, the aggregate is preferably fired to a temperature of about 1100° C. If the firing is continued to 1150° C. a somewhat smaller amount of lime is required. Firing increases the strength of the aggregate.

In developing the aggregate to which the invention relates, it was found that as the amount of water retained by the aggregate is increased (within limits) the strength of the set cement mixture is increased. This apparently is due to the fact that the cement slurry penetrates to a certain extent into the aggregate and produces a better bond than if the aggregate is non-absorptive.

The following table indicates the effect of moisture absorption and firing at different temperatures on aggregate containing 5 percent of lime. The water absorption of the fired product is given, together with the so-called "hex-nut strength." These terms will be described more particularly in what follows.

*Table I*

EFFECT OF FIRING AND WATER ABSORPTION OF AGGREGATE ON STRENGTH

| Aggregate | Water Abs. (percent) | Hex Nut Strength (lb.) |
|---|---|---|
| None | | 12,120 |
| Tunnel Kiln (1,150° C.) | 4.0 | 16,240 |
| Lab. Kiln (1,100° C.) | 12.2 | 19,280 |

PROPERTIES OF AGGREGATE

In describing the aggregate and comparing its properties with other aggregates, reference will be made to two types of tests to determine the affinity of the aggregate for water, identified as (1) the water-absorption test and (2) the water-retention test.

*Water-absorption test.*—The powdered unfired aggregate is pressed into discs which are then fired. After firing, they are weighed and then immersed in water which is subsequently boiled with the discs in it. After two hours the discs are removed from the water, the excess water is removed from the surface and the wet discs weighed. The amount of water retained as a result of this treatment is called the "water-absorption."

*Water-retention test.*—Aggregate grain is immersed in water and the mixture stirred occasionally during a two-hour period. The mixture is then screened to remove the major part of the water. The damp material is then transferred to a container and weighed. After oven drying for a suitable period of time, the container is weighed again and the loss in weight represents the water retention of the grain.

Also, reference will be made to two types of strength tests, namely (1) the hex-nut test, and (2) standard modulus of rupture test. Such tests were run after cement had set seven days.

*Hex-nut strength.*—A ⅞" x 2" cap screw and a 1¼" hex nut in which the cap screw fits loosely are cemented together and, after the cement has cured, the force necessary to push the cap screw on through the nut by shearnig the cement is taken as a measure of strength, and is referred to as the "hex-nut strength." The test was devised as approximating the conditions to which the cement is subjected during testing a suspension insulator to destruction.

The following table compares the water retention of selected aggregates. A preferred aggregate of this invention, prepared by firing ball clay and 5 percent of lime at 1100° C., is referred to in this table and other tables as aggregate H-10. The size of the aggregate is indicated by the mesh, designated by "M." The table compares water retention of a smaller aggregate with a commercial light-weight aggregate of the same size. The water retention of a somewhat smaller aggregate is then given. Then there is a comparison of the water retention of aggregate of a smaller size with quartz sand of the same size.

*Table II*

WATER RETENTION OF SELECTED AGGREGATES

| Aggregate: | Water retained (percent) |
|---|---|
| H-10, −16 +35 M | 34.4 |
| Commercial lt.-wt., −16 +35 M | 52.6 |
| H-10, −20 +35 M | 39.5 |
| H-10, −40 +60 M | 42.5 |
| Quartz sand, −40 +60 M | 27.0 |

The commercial light-weight aggregate retains more water than the aggregate of this invention. Other tests have shown that the strength of a cement mixture made with such aggregate is inferior to that made with the aggregate of this invention. The table further shows that quartz sand retains much less water than the aggregate of this invention. Other tests have shown that it produces a weaker cement.

If the water absorption characteristics of the aggregate grain are satisfactory to promote good bond with the cement, then the strength of the grain itself may be important in determining the strength of the mixture. The strength of the grain is determined by crushing an aggregate.

*Crushing strength.*—In this test a volume of grain is compressed in a steel die to a pressure of 4000 p.s.i. so that some of the grains are crushed. By choosing a sieve finer than that of the size of the original aggregate grain, the crushed material is sieved through this screen and the amount passing through the screen gives an indication of the crushing strength of the grain.

In the following table the first comparison is between aggregate of this invention prepared as described in connection with Table II, with a commercial light-weight aggregate of the same size. After crushing more light-weight aggregate passed through a 60-mesh screen, showing that this was not as strong as the aggregate of this invention.

The next comparison is between the aggregate of this invention and quartz sand. Less of the quartz sand passed through a 100-mesh screen, showing the quartz sand to be stronger than the aggregate of this invention. However, the quartz sand as shown by Table II does not have the water retention required to obtain a good bond with the cement, and is therefore inferior.

*Table III*

CRUSHING STRENGTH OF SELECTED AGGREGATE

| Aggregate | Amount Passing Through Indicated Screen After Crushing (percent) | |
|---|---|---|
| | 60 M | 100 M |
| H-10, −16 +35 M | 3.5 | |
| Lt.-wt., −16 +35 M | 14.3 | |
| H-10, −40 +60 M | | 2.3 |
| Quartz sand, −40+60 M | | 0.9 |

THE CEMENT MIXTURE

The insulator strength depends not only upon the strength of the aggregate but also upon the formulation of the cement mixture. More or less aggregate can be used in the range of 35 to 60 parts of aggregate to 65 to 40 parts of Portland cement. The amount of water added is the minimum required to produce the fluidity necessary to bond the insulator to the hardware. This will depend upon the amount of cement in the mixture. It also depends upon the water absorption of the aggregate.

The exact mechanism of the reaction is not understood but it is possible that the improvement in strength obtained with the preferred aggregate of this invention is due to the water absorption rate of the aggregate being so slow that the cement can be placed properly after the water has been added without sufficient water absorption to dry the cement to an unworkable condition, and then shortly after that sufficient water is absorbed by the aggregate to reduce the amount of water available to the setting cement. The less water available (within limits) to the setting cement the stronger the product. The theory of operation just stated may account for the strength of the product as explained, although there is little or no factual basis as yet to support the theory.

It has been shown that the strength varies with the size of the aggregate. Table IV shows the effect on the strength of the cement mixture caused by varying the amount of aggregate employed. The amount of water is varied with the amount of aggregate because with the smaller amount of aggregate more water is required to give the required fluidity to the cement. The amounts of water given in the table may be varied by perhaps 10 percent, plus or minus, but the amounts given are preferred and produce a commercially workable cement mixture. The table refers to 1000 gram mixtures of aggregate and cement, and the amount of water used is given in milliliters. It is to be understood that each of the cement mixtures in the table includes the amount of cement necessary to bring the total of aggregate and cement to 100 percent.

*Table IV*

EFFECT OF AMOUNT OF H-10 AGGREGATE (1100° C.)

| Amt. of Aggregate (percent) | Mixing Water (ml.) | Hex Nut Strength (lb.) | Modulus Rupture (p.s.i.) |
|---|---|---|---|
| 0 | 270 | 19,480 | 740 |
| 10 | 235 | 16,820 | 1,265 |
| 20 | 220 | 18,180 | 1,680 |
| 30 | 190 | 21,500 | 2,050 |
| 40 | 175 | 23,160 | 2,290 |
| 0 | 270 | 17,600 | |
| 40 | 175 | 20,800 | 2,280 |
| 50 | 160 | 24,800 | 2,435 |
| 60 | 145 | 14,200 | 2,545 |
| 70 | 140 | 6,520 | 1,460 |

It will be noted that the mixture which gives the highest hex-nut strength is not the mixture which gives the highest standard modulus of rupture. In general, in production mixtures a somewhat smaller amount of aggregate from that used to produce the maximum hex-nut strength will be utilized. This is because the curve approaching the maximum strength has a relatively gradual slope and the slope drops off sharply after passing through the maximum. Even under the most closely controlled conditions, the properties of the product vary and the hex-nut strength will vary from batch to batch in which the same formula is employed. For these reasons the cement mixture containing 40 percent of aggregate is selected as preferred for commercial operations. The aggregate might vary from 35 to 50 percent or thereabout. Table IV shows variations in strength produced by varying the amount of aggregate in the mix.

In producing the cement mixture, the cement and aggregate are preferably mixed before adding the water. If the aggregate is soaked in water before adding the cement, cement mixtures having much poorer strengths are obtained.

THE CURE

The cement mixtures are cured in any usual way; that is, either by submerging the cement product in water at room temperature for about 12 hours, or exposing it to a humid atmosphere (i.e., an atmosphere approaching saturation with water) for about 12 hours. To complete the cure the product is then placed in a curing tank in which steam is introduced, usually at about 120° F., and the product is left in the tank for about four days. On removal from the tank the assembled insulator, with the hardware attached, is ready for immediate use.

The following table records typical strengths obtained with post insulators in a usual cantilever strength test:

*Table V*

STRENGTH OF INSULATORS

Posts, cantilever strength:                                     Lb.
    No aggregate _____ 3100
    With H-10 _____ 3580

To obtain high strength in the insulator, the amount of lime added to the ball clay and the temperature to which this mixture is fired are influential. The mixture is not completely fused to form a glass but only fluxed to the extent required to obtain the desired properties. This procedure controls the amount of water absorption and crushing strength of the aggregate. The strength of the insulator is also influenced by the particle size of the fired aggregate and the amount employed in the cement mixture. A minimum amount of water is used in the mixture.

The invention is covered in the claims that follow.

What I claim is:

1. The method of producing and using a cement which includes firing at substantially 1100° to 1150° C., a mixture of (1) substantially 2.5 to 7.5 parts (by weight) of lime with (2) 100 parts of ball clay of the class consisting of Hanover clay and English ball clay and (3)

sufficient water to at least dampen the mixture, and on such firing obtaining a dense, strong product, cooling the fired product and then crushing the same and separating aggregate of substantially −16 to +60 mesh and mixing (a) 35 to 50 parts (by weight) of said aggregate with (b) 65 to 50 parts of Portland cement and (c) water in no substantial excess over the minimum amount required for working the cement, and thereafter curing the cement.

2. The process of claim 1 in which substantially 5 parts of lime is used, said lime and clay mixture is fired at substantially 1100° C., and aggregate of substantially −16 to +35 mesh is used.

3. The process of claim 1 in which substantially 5 parts of lime is used, said lime and clay mixture is fired at substantially 1100° C., aggregate of substantially −16 to +35 mesh is used, and substantially 40 parts of aggregate and 60 parts of Portland cement are used.

4. The process of claim 1 in which substantially 5 parts of lime are mixed with 100 parts of the ball clay and water is added to this, said lime and clay mixture is fired at substantially 1100° C., aggregate of substantially −16 to +35 mesh is used, and substantially 40 parts of aggregate and 60 parts of Portland cement are used.

5. The process of claim 1 in which the lime and ball clay are mixed and the water is added to this mixture.

References Cited in the file of this patent

UNITED STATES PATENTS

| Re.16,750 | Hayde | Sept. 27, 1927 |
| 2,250,044 | Croskey et al. | July 22, 1941 |
| 2,297,539 | Diamond | Sept. 29, 1942 |